(No Model.)

W. C. EDGE.
PROCESS OF PRODUCING ORNAMENTS FROM METALS, &c.

No. 298,358. Patented May 13, 1884.

Witnesses:
John C. Tunbridge,
John M. Speer.

Inventor:
Wm. C. Edge
by his attorneys
Briesen & Steele

N. PETERS. Photo-Lithographer. Washington. D. C.

UNITED STATES PATENT OFFICE.

WILLIAM C. EDGE, OF NEWARK, NEW JERSEY.

PROCESS OF PRODUCING ORNAMENTS FROM METALS, &c.

SPECIFICATION forming part of Letters Patent No. 298,358, dated May 13, 1884.

Application filed October 1, 1883. (No model.)

*To all whom it may concern:*

Be it known that I, WILLIAM C. EDGE, of Newark, in the county of Essex and State of New Jersey, have invented a new and Improved Process of Producing Ornaments from Metals and other Substances, of which the following is a specification.

Figure 1:
Figure 2:
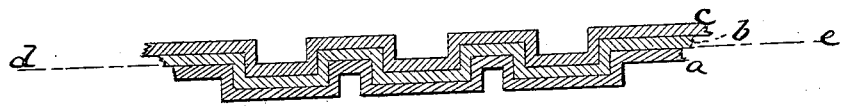
Figure 3:
Figure 4:

Figure 1 is a plan view of the ornament produced by my process. Figs. 2, 3, and 4 are sectional views of the metal, showing it in its various stages of advancement.

The object of this invention is to produce skeleton ornaments of metals or analogous substances without necessitating hand labor or expensive workmanship.

The invention consists, principally, in embossing the metal or metals to be formed into the skeleton ornament while they are supported upon a plate of copper or other substance which is not finally to enter into the ornament, and in then filing off the raised parts of the embossed metal, and in finally destroying, by chemical or other means, the supporting-plate of copper or other substance.

With more particular reference to the drawings, I will now describe my process.

I first take a plate of copper, upon which I place a plate of gold or other metal, and upon this again a plate of silver or other metal. These plates are sweated or soldered together, and are then rolled out to the proper thickness. They are then put in an embossing-press and struck up in the desired way, as shown in Fig. 2, where *a* represents a plate of copper, *b* the plate of gold, and *c* the plate of silver. These plates are embossed, as in Fig. 2, so as to bring the parts of the gold and silver which are not to enter into the desired ornament above the upper plane, *d e*, of the copper. The compound embossed block of metal is now filed down to the line *d e*, leaving it in the condition shown in Fig. 3—that is to say, leaving the desired parts of the gold and silver which are actually to enter into the ornament embedded in the copper. The different pieces of gold and silver may be quite fine threads so embedded in the copper, for producing such ornaments, as shown in Fig. 1.

The compound plate, when in the condition shown in Fig. 3, may now be further embossed, if desired, to raise the faces of gold and silver ornaments; and the latter may be further engraved by hand or treated with enamel or otherwise. Being embedded in the copper plate, the gold and silver ornaments are easily manipulated and operated upon. Now, as a final step, I expose the copper to a suitable acid—such as nitric acid—by which it will be entirely eaten away, while the gold and silver remain unaffected. This will leave the gold and silver ornament as a sort of skeleton-work or open-work analogous to filigree, as is indicated in Fig. 1.

I do not confine myself to the employment of any number of sheets of metal or other substance out of which this open-work ornamentation is produced; nor is the invention limited to metals, as it may be worked in plastic substances which harden after they are embossed, and which may be spread upon a sheet of fabric before embossing, such sheet of fabric before embossing taking the place of the sheet of copper heretofore described; and when the ornament has finally reached its perfect state, the sheet of fabric may be burned or otherwise obliterated.

Where the invention is used entirely on metals, a lead foundation-plate instead of copper will also be of great advantage, as it can be obliterated in the final stage of the process by the application of but little heat.

I claim—

The process described of making open-work ornaments, which process consists in first uniting the sheet or sheets from which the ornament is to be made to a foundation plate or sheet, *a*, in then embossing the whole, then filing down to the foundation sheet or plate, and finally obliterating the foundation sheet or plate, as specified.

WILLIAM C. EDGE.

Witnesses:
A. V. BRIESEN,
WILLY G. E. SCHULTZ.